Patented June 20, 1939

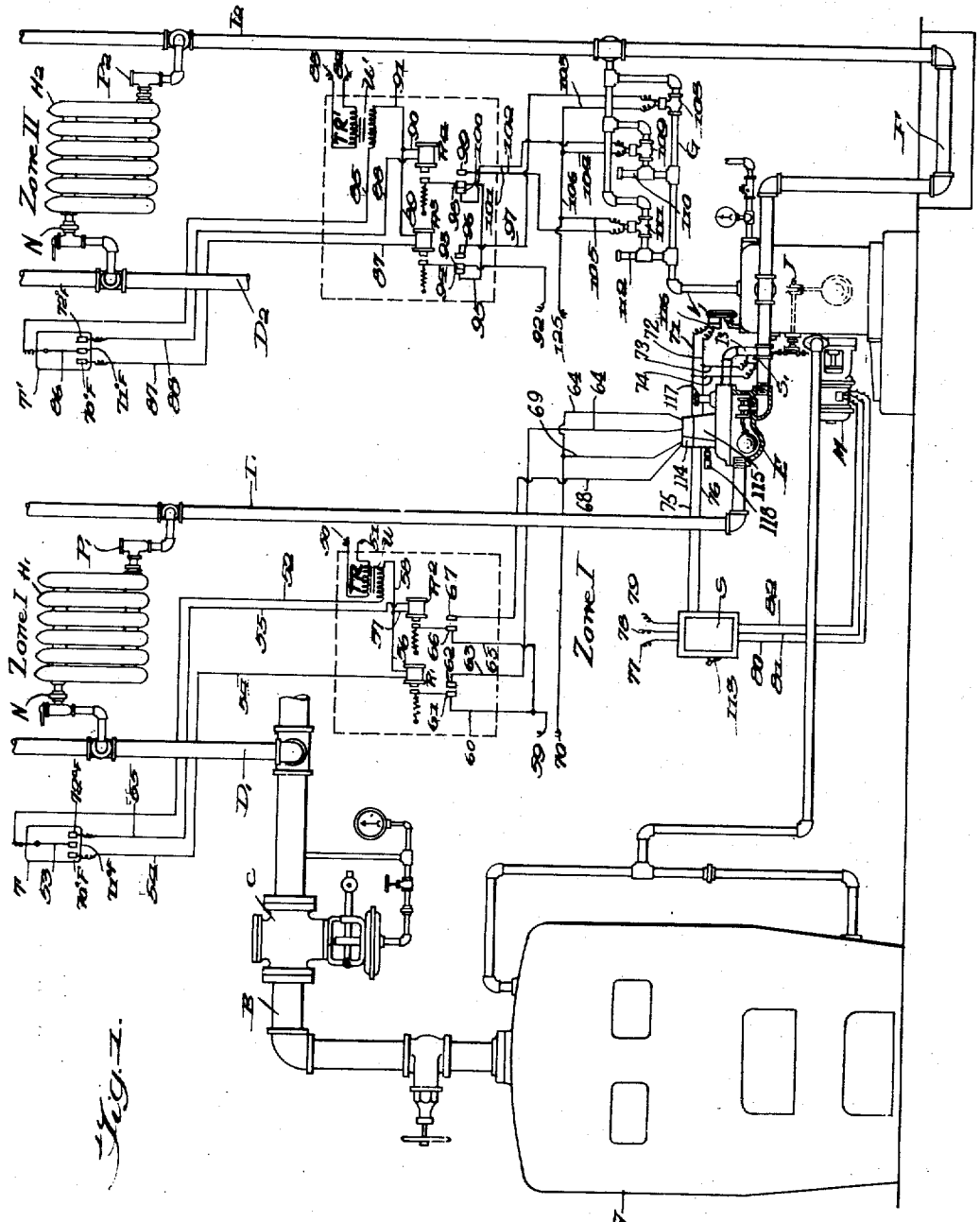

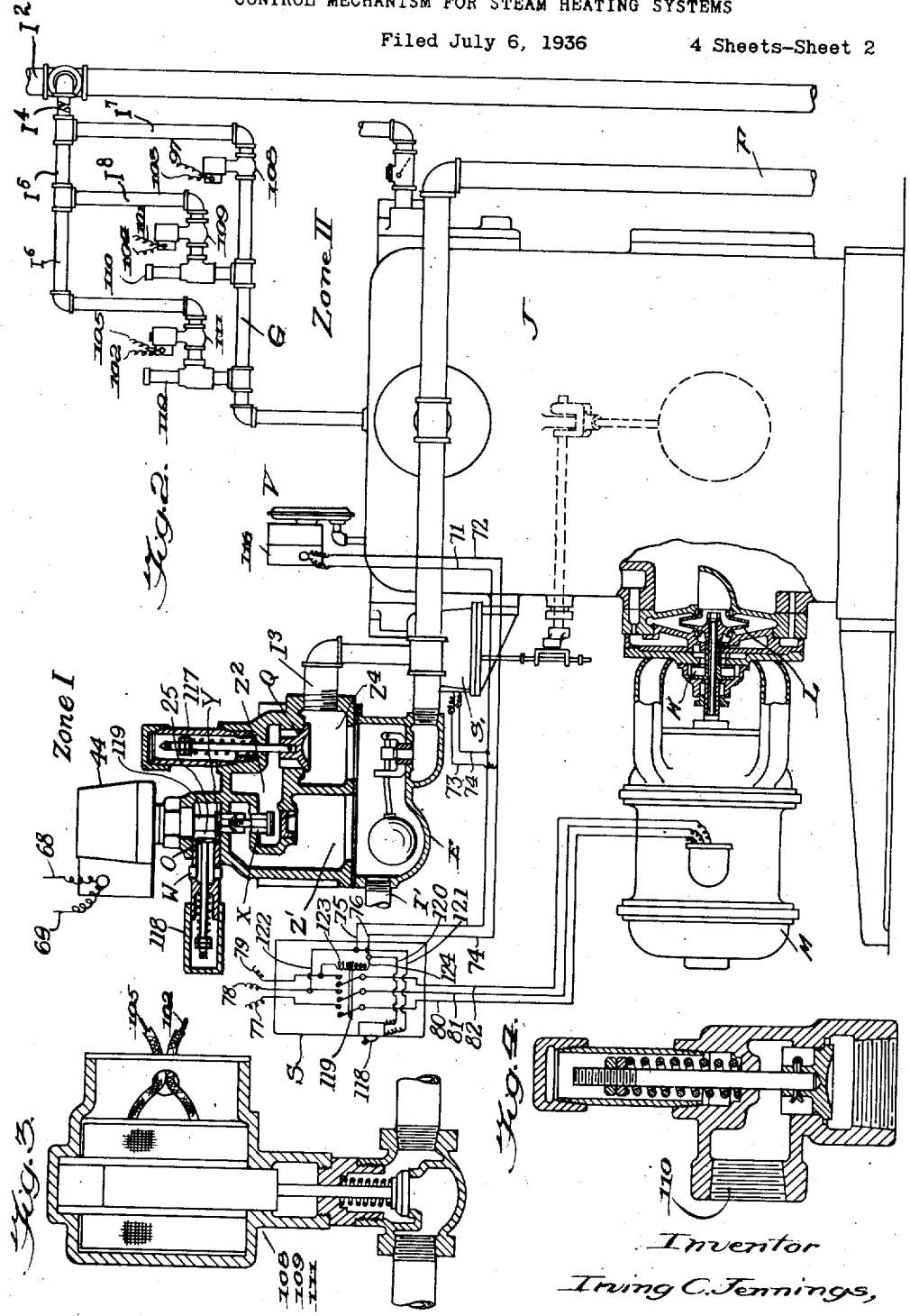

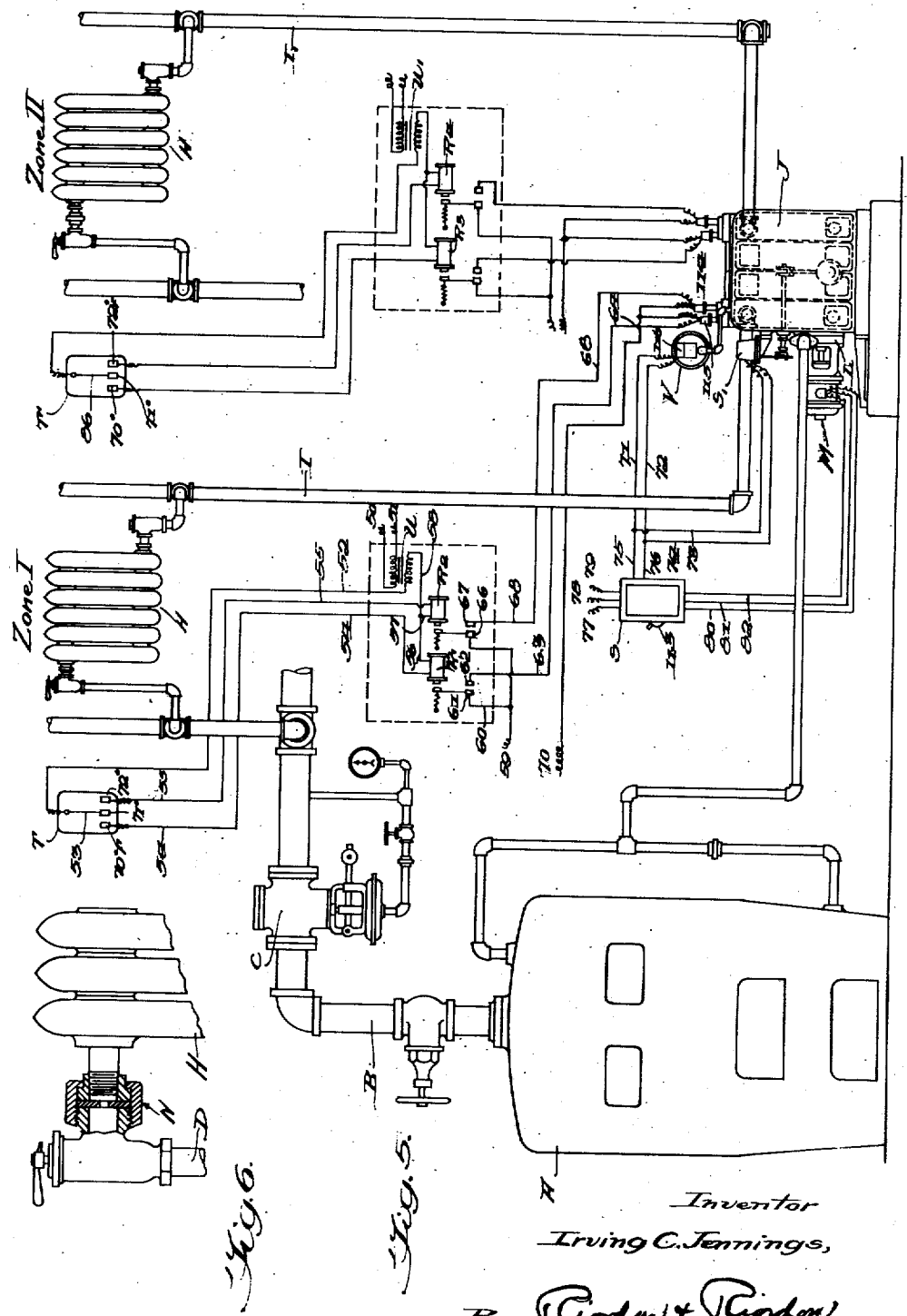

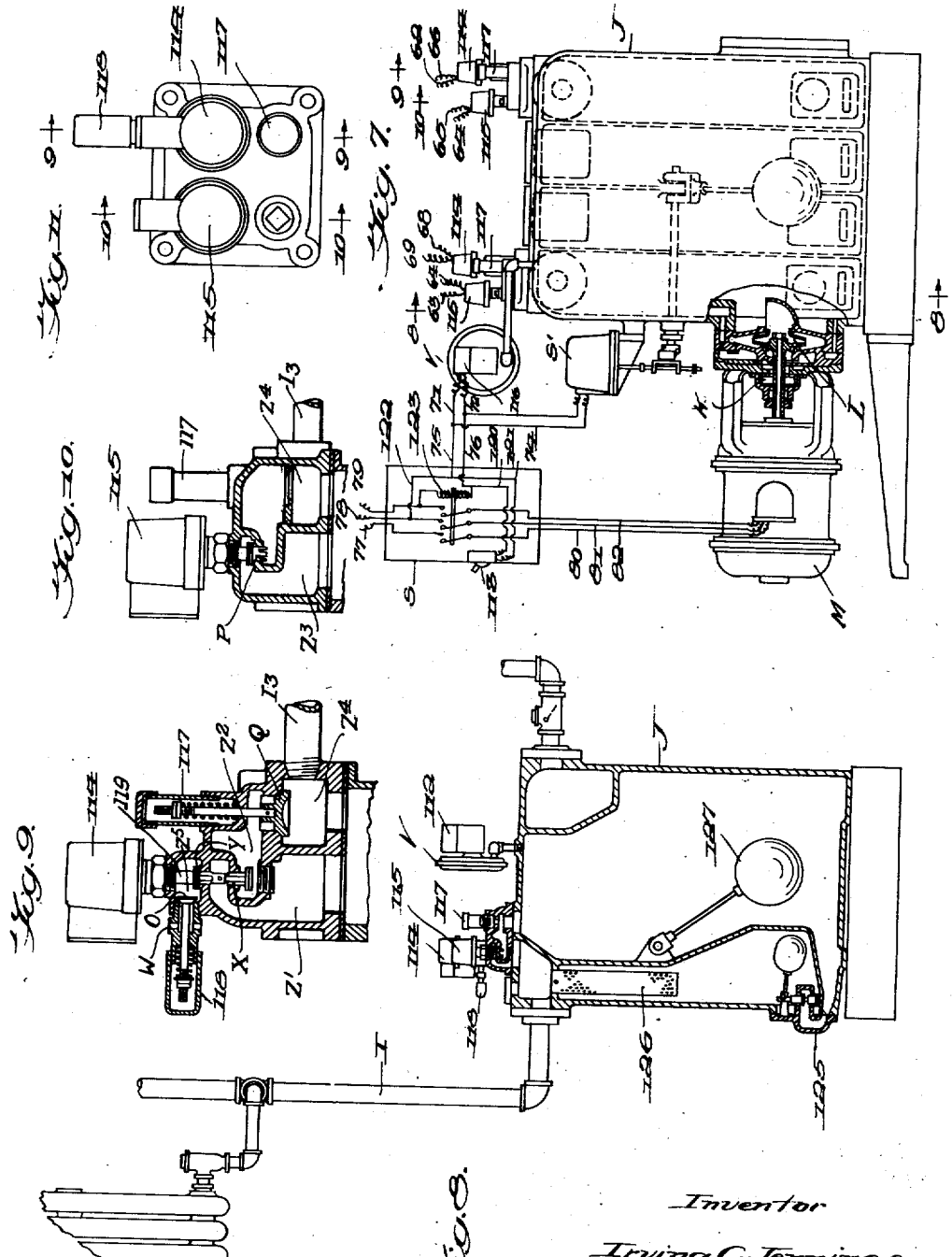

2,162,952

UNITED STATES PATENT OFFICE 2,162,952

CONTROL MECHANISM FOR STEAM HEATING SYSTEMS

Irving C. Jennings, South Norwalk, Conn.

Application July 6, 1936, Serial No. 89,230

20 Claims. (Cl. 237—9)

This invention relates to heating systems and more particularly to improvements in vacuum steam heating systems, as described in my co-pending application Serial No. 9,894, filed March 7th, 1935.

An object of the invention is to provide a new and improved control mechanism for a vacuum steam heating system.

A vacuum steam heating system comprises a boiler or source of steam supply, radiators through which the steam is conducted, returns from the radiators leading to a receiving tank, and a vacuum pump connected to the tank or returns for removing the air or gas from the system and creating a vacuum in the returns.

A water pump is also usually provided to return the water of condensation to the boiler.

It is desirable to provide control mechanism so that the supply of steam will be adjusted automatically to different temperature conditions, and it is also desirable to operate the system, and controls therefor, with a constant steam pressure on the supply side of the system.

The control mechanism consists of means attached to the returns or to the receiving tank and connected mechanism arranged so that the degree of vacuum will be varied automatically or adjusted, in the return side of the system. This adjustment is preferably made by thermostatically operating mechanism.

In my aforementioned application, there is described such a system, in which steam is introduced into the supply at substantially constant pressure. Orifices are introduced in the radiators, and vacuum varied by thermostat controls, to fill the radiators more or less completely, thereby to maintain a constant temperature in the space to be heated. Said system includes a turbine driven vacuum pump and an auxiliary or motor driven vacuum pump both operable in a single heating zone. The variation in vacuum in the system is secured by thermostatically controlled relief valves and a control of the motor driven vacuum pump by vacuum regulators to maintain different degrees of vacuum, which in turn causes a variable partial filling of the radiators.

The present invention contemplates, as an improvement, use of one vacuum pump to maintain a constant vacuum in receiver and returns, and the returns from one, or several heating zones, or separate heating systems supplied from one or more sources of steam, at constant but not necessarily the same pressure on each zone, are connected to this vacuum pump, and receiver. The vacuum in the various zones is varied by the use of solenoid valves and reducing valves controlled by thermostats, and no air is introduced into the system except at one point of operation, as shown in one zone, to disable the system when overheating has occurred.

The improved system further includes traps, either of the float type or water loop type, interposed between each zone and the vacuum pump, in order that the several zones may be connected into the common return pump, which is maintaining a constant vacuum.

Other objects of the invention include the interposition of a reducing valve in the system controlled by thermostatically operated valve, under the influence of the temperature in the space to be heated; an arrangement whereby the system may be disconnected from the vacuum pump, and a relief valve opened to vent a zone without breaking the vacuum in the pump; the arrangement of the system to permit zoning; the combination of a vacuum heating pump with built-in or integral traps and vacuum control valves for a plurality of zones; the combination of a water loop in lieu of a trap with vacuum control means; and the use of a float trap with vacuum control means.

To the attainment of the foregoing, and other objects which will appear as the description proceeds, reference may be made to the accompanying drawings in which:—

Fig. 1 is an elevation, partly in section, showing a vacuum steam heating system, in which the motor driven pump and receiver control a plurality of zones;

Fig. 2 is an enlarged elevation partly in section of the pumping and control mechanism, illustrated in Fig. 1;

Fig. 3 is an enlarged sectional elevation of a solenoid control valve for controlling vacuum in the return side;

Fig. 4 is an enlarged section of a reducing valve used in the return line;

Fig. 5 is a view similar to Fig. 1, but illustrating a modification in the system;

Fig. 6 is an enlarged detail partly in section, illustrating a radiator supply pipe provided with a restricted orifice;

Fig. 7 is an enlarged elevation, partly in section of the pumping mechanism and receiver illustrated in Fig. 6;

Fig. 8 is a section on the line 8—8 of Fig. 7;

Fig. 9 is a detail partly in section, on the line 9—9 of Fig. 11;

Fig. 10 is a detail partly in section, on the line 10—10 of Fig. 11; and

Fig. 11 is a plan view of the valve unit shown in Figs. 9 and 10.

Referring now to the drawings, wherein like reference numerals designate like parts, and particularly to Figs. 1 to 4, A designates a steam boiler, from which steam is led by a supply pipe B. An adjustable pressure regulator C is interposed in this pipe so that steam will be supplied at a constant pressure. Branch pipes $D_1$ and $D_2$ lead to the radiators $H_1$ and $H_2$ which are connected by suitable return pipes $I_1$ and $I_2$ to the receiving tank J of a so-called wet vacuum pumping system. Interposed between the receiver J and the return $I_1$ from the first zone is a float trap E, and interposed between the return $I_2$ of a second zone, and the receiver J is a trap or water leg F.

The pumping mechanism (Figs. 2 and 7) consists of a Nash pump K connected to remove the air or gas from the return side of the system, and a centrifugal pump L, the impeller of which is connected to remove the water of condensation from the tank J, and preferably to return the same to the boiler A. The pumping unit is driven by a motor M, which may be controlled from a magnetic starter switch S and a float switch S', as hereinafter described. The supply pipes D are preferably provided with orifices N, and the usual traps $P_1$ and $P_2$ provided in the radiator returns.

From the foregoing it will be seen that a single receiver J having a single pumping unit K—L—M is connected to maintain a vacuum in at least two zones, with a supply of steam at a constant pressure. The return from the first zone utilizes the float trap E to the receiver, and the return from the second zone utilizes the water leg seal F, although the return $I_2$ of the second zone is also connected to the receiver by a dry leg G, above the trap or water leg F. Each of these trap devices allows the water of condensation to return to the pump, as it accumulates, but permits a regulation of the vacuum in each zone by a system of control valves. For example in zone I the solenoid valve 114 which controls a regulating valve 117 and the auxiliary relief valve 118, and the solenoid valve 115 which establishes direct communication to the receiver may be utilized, the solenoid valves being under control of a thermostat T which determines the necessary degree of vacuum in accordance with temperature of the zone. In zone II the regulating or relief valves 110 and 112, respectively controlled by solenoid valves 109 and 111, and the solenoid valve 108 which establishes direct communication between the return and the receiver, may be utilized, the solenoid valve in this instance being controlled by a thermostat T' suitably located in the zone.

Air is allowed to pass into the receiver J, which is maintained at a substantially constant vacuum, by the regulation of the air valves, which are connected between the return of each zone and above the water level of the respective traps.

In other words, for a given constant of vacuum within the receiver J, the vacuum in respective zones can be varied from a maximum determined by the receiver, to a minimum determined by the valves. As an example, assume that a six inch vacuum is maintained in the receiver J, this being sufficient to fill the radiators, and that a four inch vacuum will be sufficient to fill the radiators to an amount which will maintain the temperature at a normal of 71° F. The regulating valve 117 can be set to ensure such four inch vacuum and the relief valve set to permit a leakage to a two inch vacuum. Operation of the solenoid control valve 114 under the influence of the thermostat will then determine which of these regulating valves will be operative. The valve 115 may be utilized to establish direct communication between the zone and the receiver, whereupon a full six inch vacuum in the zone will be obtained.

Similarly in zone II the relief valve 112 may be set for a two inch vacuum in tank J, the valve 110 set for a four inch vacuum, these valves being controlled by the solenoids 111 and 109 respectively, and the solenoid valve 108 may establish direct communication to the receiver.

The general outline of operation can best be described by considering the various operating conditions required, as (a) A normal or satisfied condition in which temperature of approximately 71° F. is maintained, (b) An underheated condition in which the temperature has dropped, for example to 70° F., (c) An overheated condition in which the temperature has risen for example to 72° F.

Condition (a) may be maintained with a normal vacuum of say four inches, which will maintain the radiators approximately half filled.

Condition (b) will require the maximum vacuum, which, it is assumed is the six inch vacuum constantly maintained by the receiver, and Condition (c) will require a reduction in vacuum to possibly two inches, whereby the radiators will be but slightly filled, say to one-eighth capacity.

In Fig. 1 condition (a) is illustrated and as shown the transformer U connected by leads 50 and 51 to any suitable source of current passes low voltage current from the secondary of the transformer to the thermostat T, the secondary being connected to the switch blade 53 of the thermostat by a line 52. As illustrated the switch blade is in a mid position designated as 71° F. and no current can pass through the thermostat. Contacts designated as 70° F. and 72° F. are provided in the thermostat, the former being connected by a line 54 to a relay R' and the latter being connected by a line 55 to a relay $R^2$. Both relays are connected by a line 56—58 back to the secondary of the transformer U, the relay $R^2$ being tapped in by a lead 57.

Current to the power circuit cannot flow, as contacts 61 and 62, and 66 and 67 are open. Under the conditions (a) as illustrated, the valve portion of the solenoid 114 will be in the position illustrated in Fig. 9, so that regulating valve 117 has access to the receiver J, and as this valve is set to maintain, in the example, four inches of vacuum in the return line, the normal or satisfied condition necessary to produce a temperature of 71° F. is obtained. Considering condition (a) solely for zone I, the operation may be described as follows:

The blades 53 of thermostat T will be in the 71° F. or open circuit position and no current will flow in either circuit supplied from 59 and 70 or circuit 52 and 58 from secondary of transformer TR. The automatic controller 114—115—117—118—119 is de-energized and positioned as shown in Figs. 9 and 10 and functions to maintain a vacuum in the return line $I^1$ of say 4".

The wet returns or condensate returning through pipe I collect in ball float trap E until a sufficient quantity has gathered to raise the ball float, thus opening the connected valve mechanism and passing the condensate to the receiver tank J, where it is ultimately returned to the boiler by the automatic operation of the water pump.

The ball float trap E functions as an effective water seal between return piping I and receiver tank J to permit close regulation of vacuum values in the return lines of the heating system by the automatic controller 114—115—117—118—119.

The return vapors pass through Fig. 9 in this case, rising through chamber $Z^1$, passing through valve X to chamber $Z^2$, actuate valve Q to maintain a vacuum value of say 4" in $Z^2$ and 6" in $Z^4$. Any vapors carried over pass through chamber $Z^4$ and pipe $I^3$ to the receiver tank J and are discharged by the air pump and attendant automatic controls. Under this condition the radiators are maintained about one-half full of steam.

However, if the desired temperature of 71° F. is not maintained, and the conditions assumed for example (b) prevail, then the blade 53 of the thermostat T will swing to the 70° F. contact, and the low voltage current from the secondary of transformer U will flow along the line 52, through the blade 53 and the 70° F. terminal, and thence to the relay R' through line 54, eventually returning to the secondary of the transformer along lines 56 and 58.

Due to energization of the relay R', the armature thereof will position contact 61 against contact 62 so that the circuit is established from the input line 59 along line 60 to the coil of the solenoid valve 115 (Fig. 11) through such coil along the line 64 to the power input line 70. The valve portion of the solenoid 115 will thus open and place the return I' in direct connection with the receiver J so as to apply the full six inches of vacuum on the returns. The differential across the radiation system will be sufficient to completely fill the radiators and quickly correct the condition of underheating.

Upon reestablishment of a 71° F. temperature, the blade 53 of the thermostat will again assume a position breaking the relay circuits, and the controls will then return the system to normal condition. Considering condition (b) for zone I, the operation may be described as follows:

Assume an existing normal, 71° F. condition with a dropping temperature in the area to be heated. When the temperature drops to 70° F., the blade 53 of thermostat T moves to and closes contact 70° F. and current flows from the secondary of transformer TR along line 52 through blade 53 and contact 70° F., along line 54 through electro-magnet coil of relay $R^1$, along lines 57 and 58 to other side of transformer secondary, completing the circuit and energizing relay $R^1$, causing the contact carrying armature to move against the magnetized core of the electro-magnet, closing contacts 61 and 62. Current now flows from 59 along line 60, through contacts 61—62, along line 63, to the electro-magnet coil of solenoid valve 115, along line 64 to and along line 70, completing the circuit and energizing solenoid valve 115, causing it to lift and open valve P, Fig. 10.

The condensate or wet returns continue as described for condition (a), maintaining a water seal to enable controlled vacuum in the return lines. Referring to Fig. 10, the vapors now rise through chamber $Z^3$, pass through valve P to chamber $Z^4$ and through pipe $I^3$ to receiver J. As the system $I^1$ is now directly connected to receiver J through the automatic controller, Fig. 10, the vacuum value will be equal to that of the receiver, say 6", as automatically regulated by the vacuum control switch V and the air pump. The system radiators will now be filled with steam.

On the other hand, assume that outside conditions change so that the heat supplied by the half filled radiators will cause overheating of the zone. Under these circumstances the thermostat blade will swing to the 72° F. contact and establish a circuit through the relay $R^2$ over the lines 52, 55, coil of relay $R^2$ and lines 57 and 58 back to the secondary of the transformer.

When relay $R^2$ is energized, its armature will close the contacts 66 and 67, thereby closing the circuit through solenoid valve 114, which will cause a reversal of the valve discs shown in Fig. 9, due to energization of the solenoid coil, and place the auxiliary atmospheric relief valve 118 in direct communication with the return line chamber of the trap E, and the leakage through the relief valve will cause the return line vacuum to drop to two inches, in the example given. The differential thus created across the radiation system will fill the radiators approximately one-eighth full, and the overheating condition will correct itself, whereupon the blade 53 will again assume its normal or mid position. Considering condition (c) for zone I, the operation may be described as follows:

Assume an existing condition of 71° F., normal, with a rising temperature in the area to be heated. As the temperature rises to 72° F., the blade 53 of thermostat T moves to and against contact 72° F. and current flows from the secondary of transformer TR along line 52, through blade 53 and contact 72° F., along line 55, through electro-magnet coil relay $R^2$, along line 58 to other side of transformer secondary, thus energizing relay $R^2$ and causing the contact carrying armature to move against the magnetized core of the electro-magnet, closing contacts 66 and 67. Current now flows from 59 along line 65, through contacts 66—67, along line 68, through electro-magnet coil of solenoid valve 114, along line 69 to 70, completing the circuit and energizing the electro-magnet of solenoid valve 114, causing it to lift stem 119, thus opening valve Y and closing valve X.

The condensate or wet returns continue as described for conditions (a) and (b), maintaining a water seal between the return line $I^1$ and the receiver J. The automatic controller part shown in Fig. 9 is now effective. Closing valve X prevents further vapor flow between return line $I^1$ and receiver J. Opening of valve Y establishes a passage to chamber $Z^5$. With say a vacuum value of 4" in chambers $Z^5$, $Z^1$ and return line $I^1$, the atmospheric relief mechanism 118 becomes effective and operates to open valve O, admitting air through ports W and valve O to chambers $Z^5$—$Z^1$ and return line $I^1$ until the vacuum value is adjusted to say 2", when valve O and relief mechanism close, re-opening from time to time as required to maintain the vacuum value in chambers $Z^5$—$Z^1$ and return $I^1$ at 2" maximum. The radiators of the system will now be about one-eighth filled with steam.

In zone II the operation is substantially the same as in zone I, except that a loop or water leg F is used in place of the float trap, and the atmospheric relief valve 118 is omitted, which changes the operation slightly when a small amount of heat is required as described hereafter.

Reducing valves 110 and 112, an example of which is shown in detail in Fig. 4, are interposed between the return line I² in the vacuum pump. These valves are put into operation between the pump and the return, by the operation of solenoid valves 109 and 111, which are controlled thermostatically, from a thermostat T'.

By adjusting the tension of the springs of these reducing valves, the vacuum in the return may be controlled, and may be made lower than in the receiver J.

Taking the same examples given for zone I, we find that the normal or satisfied heating condition may be obtained when the solenoid valves 108 and 111 are in their closed position and the solenoid 109 open, which will cause the reducing valve 110 to operate. This valve 110 may be set to have a resistance of two inches, thus producing four inches of vacuum in the return, if the vacuum maintained in the receiver is six inches, and this will cause a partial filling of the radiators. Should it be desired to fill the radiators in this zone completely then the solenoid valve 108 will be wide open and the maximum vacuum in the receiver J will be applied to the return line, causing a sufficient differential to fill the radiators full of steam, right up to the return trap P², thereby creating a maximum heating effect from the radiator.

On the other hand, if overheating should result, the solenoid valve 109 will close and the solenoid 111 open, which will cause approximately a four inch drop through the reducing valve 112, leaving a vacuum of approximately two inches to be maintained in the returns.

In describing the circuits more in detail, reference may be made to Fig. 1, which illustrates the normal or satisfied condition (a) of about 71° F. The thermostat T' of this zone has a blade 86, shown in its mid or disconnected position, and hence there is no flow of current through the relay circuits, and the relays R³ and R⁴ are de-energized. These relay circuits are similar to those of the first zone, leads 83 and 84 connecting the transformer U' to a suitable source of current, the secondary being connected by line 85 to the switch blade 86, and the low temperature terminal 70° F. being connected by line 87 to the relay R³, which in turn is connected back to the secondary of the transformer through lines 89 and 91.

The other terminal for 72° F. is connected through line 88 to the relay R⁴ which by lead 90 taps into line 91 and back to the transformer. The power circuit is established from the input line 92 through contacts 93 and 94 to lines 95 and 101 which extend through the coil of the solenoid valve 109 along lines 104 and 106 and thence back to the power input line 125.

Normal heating (example a) is obtained by energization of solenoid 109 which causes the valve portion to open and interpose the relief valve 110 between the return line I² and the receiver J, this valve 110 being set to maintain, in the example, four inches of vacuum in the return, it being understood that the pumping mechanism is still maintaining a six inch vacuum in the receiver J. The differential across the radiation system will cause the radiators to be approximately half filled.

With reference to condition (a) as applied to zone II, the operation may be described as follows:

Assume a normal condition, temperature 71° F., in the area to be heated. The blade 86 of thermostat T¹ will be in the 71° F. or open circuit position and no current will flow in the circuit supplied by the secondary of the transformer TR¹. Both relays are de-energized and as they actuate single pole, double-throw contact making switches, contacts 93—94 of relay R³ and contacts 98—100 of relay R⁴ are closed.

Current flows from source along line 92 through closed contacts 93—94 of relay R³, along line 95 through closed contacts 98—100 of relay R⁴, along line 101, through the electro-magnet of solenoid valve 109, along line 104 to and along line 106 to 125, completing the circuit and energizing the electro-magnet of solenoid 109, causing it to open the valve, thus placing the reducing valve 110 in the dry return pipe circuit. Solenoid valves 108 and 111 are de-energized and consequently closed. Reducing valve 112 is not in circuit due to closed solenoid valve 111.

The condensate or wet returns are trapped at the receiving tank J by a loop or water leg F, thus, while providing adequate means for passage of condensate to the receiving tank, creating a water seal between the receiving tank and the dry return piping, I⁴—I⁵—I⁶—I⁷—I⁸ and G (see Fig. 2, zone 2), permitting adjustment and control of the vacuum value of the return vapors in I².

The return vapors now pass through piping I⁴—I⁵—I⁶, through the open solenoid valve 109, through the reducing valve 110, the spring mechanism of which is adjusted to maintain a pressure difference of 2"; hence with say 6" vacuum in the receiver and pipe G, and 2" in the return piping I², the reducing valve will open until a vacuum of 4" has been obtained in I², when the valve will close, reopening from time to time as the vacuum in I² exceeds 4". This will maintain the system radiators about one-half filled with steam.

Assume now that conditions of example (b) arise so that this half filling of the radiators is insufficient to maintain a 71° F. temperature in the zone, and the thermostat blade 86 swings over to the 70° F. terminal. A low voltage circuit will then be established from the secondary of the step down transformer U' along the lines 85 and 87, to the coil of the relay R³ and thence along the lines 89 and 91 back to the transformer. This will energize the relay R³ to move the contact 93 onto the contact 96 to establish a power circuit from the input line 92 along the line 97 to the coil of solenoid valve 108 and thence over line 103 to the input line 125, completing the circuit.

Energization of the solenoid valve 108 will cause the valve portion thereof to take an open position, placing the return I² in direct communication with the receiver J and thus place the maximum vacuum maintained in the receiver, on the return. The increased differential across the radiation system will cause a complete filling of the radiators to quickly rectify the condition of underheating, whereupon the thermostat assumes its normal or original position, deenergizing the relay circuit.

Amplifying the description of condition (b) as applied to zone II, the operation may be described as follows:

Assume a normal temperature condition, 71° F., in the area to be heated, with a dropping temperature.

As the temperature drops to 70° F. the blade 86 of thermostat T¹ moves toward and closes on contact 70° F. Current now flows from the secondary of transformer TR¹ along line 85, through blade 86 and contact 70° F. of thermostat T¹, along line 87, through the electro-magnet coil of relay R³, along lines 89—91 to other side of transformer secondary, thus completing the circuit, energizing the relay R³ and causing the contact carrying armature to move against the magnetized core of the electro-magnet, interrupting contacts 93—94 and closing contacts 93—96.

Interruption of contacts 93—94 opens circuit to solenoid valve 109, causing it to close. Current flows from the source along line 92, through contacts 93—96 of relay R³, along line 97, through the electro-magnet coil of solenoid valve 108, along lines 103—106—125, completing the circuit and energizing solenoid valve 108, causing it to open the valve, thus directly connecting the return line I² to the receiver tank J through I⁴—I⁷, solenoid valve 108 and pipe G. The vacuum in return line I² will now be equal to that of receiver tank J, say 6", and will be controlled and adjusted by the air pump M and vacuum regulator V. The condensate continues to return to receiver J as described for condition (a).

The radiators of the system will now be filled with steam.

This same general operation follows for condition (c) where the zone is overheated. The thermostat establishes a circuit along the lines 85 and 88 through the relay R⁴, and thence over the lines 90 and 91 back to the transformer.

The armature of relay R⁴ will act to position the contact 98 in engagement with 99 to establish a circuit from the input line 92 through the contacts 93 and 94, and line 95, along the lines 102 to the solenoid valve 111 and back along line 105 to the input line 125.

Energization of the solenoid 111 will cause the valve portion thereof to open, thus interposing the relief valve 112 between the return I² and the receiver J and as this valve will be set to maintain a two inch vacuum in the return line, which corresponds to approximately a one-eighth filling of the radiators, the overheating condition will be corrected and the thermostat will again assume its normal or mid position, deenergizing the relay circuit.

Condition (c), zone II, may be more completely described as follows:

Assume a normal temperature condition, 71° F., with a rising temperature in the area to be heated.

As the temperature rises to 72° F. the blade 86 of the thermostat T¹ moves toward and closes on contact 72° F. Current now flows from the secondary of transformer TR¹ along line 85, through blade 86 and contact 72° F. of thermostat T¹, along line 88, through the electro-magnet coil of relay R⁴, along lines 90—91 to other side of secondary of transformer, completing the circuit and energizing relay R⁴, causing the contact carrying armature to move against the magnetized core of the electro-magnet, thus interrupting contacts 98—100 and closing contacts 98—99. The interruption of contacts 98—100 opens the circuit to solenoid valve 109, causing it to close.

Current now flows from source along line 92, through contacts 93—94 of relay R³, along line 95, through contacts 98—99 of relay R⁴, along line 102, through electro-magnet coil of solenoid valve 111, along line 105—125, completing the circuit and energizing the electro-magnet coil of solenoid valve 111, causing it to open the valve, thus placing the reducing valve 112 in the dry return pipe circuit.

The condensate continues to return to the receiver J as previously described for condition (a).

The solenoid valves 108—109 are closed and the reducing valve 110 is out of circuit.

The vapors from the return line I² now pass through I⁴—I⁵—I⁶ and solenoid valve 111, through the reducing valve 112, the spring mechanism of which is adjusted to operate to obtain and maintain a 4" difference in pressure; thus with say 6" vacuum in the receiver J and pipe G, and say initially 4" vacuum in the return line I², the valve 112 will remain closed until the vacuum falls, due to system leakage, say to 2" level, when the valve 112 will become operative to maintain that level against further drop of vacuum.

The radiators of the system will now be about one-eighth filled with steam.

It might be noted that this dry line control valve arrangement does not provide a quick "leak down" feature, as in the case where the auxiliary atmospheric relief valve 118 in zone I is used, due to the fact that no air is admitted, except normal leakage into the system. This means that in a control arrangement as described for zone II, when overheating occurs, the vacuum in the zone return line I² will drop from the four inch normal to the two inch vacuum by system leakage only.

This arrangement, while satisfactory for many systems, might prove somewhat sluggish in a very tight system. For instance, if the radiators in a tight system have been filled with steam, due to the solenoid valve 108 being open, and then valve 108 is closed, and 109 or 111 open it might take some time for air to leak into the system and for the radiators to condense and become fractionally filled with steam. The arrangement described for zone I, and the valve units illustrated in detail in Figs. 9, 10 and 11 show a method of overcoming this defect. As described heretofore, two of the operating conditions are the same as in zone II, but the third condition or control arrangement for overheating differs as shown in Fig. 9, wherein the relief valve 118 may be connected to the system to permit immediate leakage of air effective to break the vacuum promptly. On some jobs, however, the relief valve 118 may be removed entirely, in which case circulation of steam will stop when overheating causes the thermostat to open the solenoid valve 14.

Controls common to all conditions are those which relate to the operation of the pumping mechanism and the maintenance of a constant vacuum in the receiver. The magnetic starter S is connected to suitable power input leads 77, 78 and 79, and the magnetic switch 119 of the starter is operable by several means, e. g., the vacuum regulator V which is adjustable to maintain a predetermined vacuum of say six inches in the receiver J, by opening and closing a switch 116, which is connected through leads 71 and 72 to the line 75 and 76 in turn connected to the starter S; through leads 122 and 124 respectively, the pull in coil 123 of the starter being interposed in lead 124; by the float switch S', connected through leads 73 and 74 to the lines 75 and 76, which switch closes when a high water level is obtained in the receiver J, causing the motor M to run until the pump L has reduced the level a proper amount by returning condensate to the boiler A; by manual operation of the hand switch 113 which through the medium of lines 120 and 121 will close the circuit through the pull in coil 123 of the magnetic starter and throw same across the input lines 78 and 79. This last operation is effective to maintain continuous operation of the motor M so that the pumping mechanism may operate continuously without regard to the vacuum regulator V or the water level float switch S'.

The motor M is connected to the magnetic starter through lines 80, 81 and 82.

It will be obvious that the vacuum regulator V and the float switch S' operate independently of each other, and under automatic operation as distinct from continuous operation, and that they may operate separately or simultaneously as system conditions may require.

The design of the parts is such that sufficient steam under the different conditions of vacuum will flow through the orifice end, which, due to their restriction, permit a close adjustment and control.

In the embodiments of the invention discussed herein, only inside thermostats are shown. However, it is obvious that a plurality of solenoids and relief valves could be controlled by an outside thermostat, for example, as described in Fig. 7 of my aforementioned copending application.

Referring now to Figs. 5 to 11, inclusive, there is disclosed a somewhat modified system, in which the water traps are built right into the pump and receiver structure. As illustrated in Fig. 5, two zones are shown connected, but space is left in the receiving tank for two more zones. In this form of the invention, both zones will be identical in apparatus and operation, hence a description of one zone will suffice for all. Fig. 8 shows a section through one trap, the float trap being illustrated at 125 and the strainer at 126. Float 127 controls the main switch in the tank for starting and stopping the motor driven return line pump, in accordance with the water level in the receiver, which with the vacuum regulator V forms the usual dual control for a vacuum heating pump, as previously described.

The first zone is illustrated in this embodiment as in its normal or satisfied condition, viz., 71° F., the blade 53 of the thermostat T being in a mid or disconnected position, and the relay coil circuits through relays R' and R² being deenergized.

A valve unit including solenoid valves 114 and 115 and the regulating or relief valves 117 and 118, previously described in conjunction with the trap E, is utilized in conjunction with each of the traps 125.

No power circuit is established for current flow from the power input line 59, as contacts 61—62 and 66—67 are open.

The self-contained spring of the solenoid 114 places the valve portion thereof in the position shown in Fig. 9, thus interposing vacuum relief valve 117 between the return I and the space under vacuum in the receiver J, this relief valve being set to maintain, as heretofore, a four inch vacuum in the return line for a maintained vacuum of six inches in the receiver J. Under these conditions, the differential across the radiation system for the zone will approximately half fill the radiators, thus giving the normal or satisfied heat condition in the zone. When external weather conditions change, such that the half filled radiators do not give sufficient heat to maintain a 71° F. temperature, then the blade 53 swings to the 70° F. terminal of the thermostat to establish a low voltage circuit from the secondary of the transformer U along the line 52 through the thermostat back along the line 54 to the relay R', along the lines 56 and 58 to the secondary of the transformer. The relay thus energized pulls the contact 61 against the contact 62 establishing a power circuit from the input 59 through the contacts 61 and 62 along the line 63 to the solenoid valve 115, along the line 64 to the input 70. Energization of the solenoid 115 opens the valve portion thereof, thus establishing direct communication between the return I₁ and the receiver J, thus placing the return line at the same vacuum as maintained in the receiver, viz., approximately six inches of vacuum. The foregoing may be somewhat clarified by reference particularly to Figs. 9, 10 and 11.

As shown in Fig. 9, the solenoid valve 114 is deenergized and in normal position, valve Y is closed, and valve X is open. The return vapors from the heating system enter chamber Z¹ and flow through valve X to chamber Z². Assuming the vacuum value of return vapors in chamber Z² to be say 2" and the vacuum value in chamber Z⁴, which is directly connected to the air pump receiving tank, to be 6", the vacuum regulating mechanism 117 attached to valve Q operates, due to difference in pressure, and holds valve Q open until the vacuum value of the return vapors in chamber Z² is raised to say 4", when valve Q closes, re-opening from time to time as the vacuum in chamber Z² exceeds the vacuum in chamber Z⁴ by say 2".

With the solenoid 114 energized, the stem 119, to which are attached valve discs X and Y, is lifted, thus closing valve X and opening valve Y. The vapor flow through valve X is now stopped and a passage is established from chamber Z¹, through valve Y to chamber Z⁵. The atmospheric relief mechanism 118 to which is attached valve O, now operates due to difference in pressure, say 4" vacuum in chamber Z⁵ and atmospheric pressure and holds valve O open, admitting air through the ports W of relief valve 118 and valve O to chamber Z⁵ and through valve Y to chamber Z¹ and return lines of system. The valve O remains open until the vacuum value in return lines, chamber Z¹ and chamber Z⁵, is reduced to 2", when valve O closes, re-opening from time to time as the vacuum value of chamber Z⁵, chamber Z¹ and return lines increases over 2".

It is obvious that omission of this relief valve mechanism but maintenance of port to atmosphere would allow, when valve Y is open, return line to come to atmospheric pressure and so cool down much quicker.

In normal or de-energized position as shown, valve P is closed and no flow occurs. When the solenoid 115 is energized it opens valve P, permitting the heating system return vapors to pass through chamber Z³, through valve P, through chamber Z⁴, and to the receiver of air pump to which Z⁴ is directly connected, thus obtaining in the return lines a vacuum value equal to that maintained in the vacuum receiver, say 6". When solenoid 115 is energized and operative as described above, solenoid 114 is de-energized and as the return line vacuum is higher than 4", the vacuum regulating valve 117 will not be operative.

The automatic controller for vacuum steam heating systems consists of two parts; the first, detailed in Fig. 9, composed of a two-way solenoid valve 114, a spring type atmospheric relief valve 118, and a spring type vacuum regulating valve 117; the second, detailed in Fig. 10, composed of a one-way solenoid valve. The body casting is designed with chambers and valves as detailed in Figs. 9 and 10, to make a complete controller assembly that may readily be adapted to the various types of installation to which it is applicable, as indicated in Figs. 1, 2, 7 and 8.

The differential thus established across the radiation system of the zone is sufficient to completely fill the radiators, thus quickly correcting the temporary condition of overheating, whereupon the thermostat blade 53 will again assume its mid position to deenergize the relief and restore the control system to the condition for normal heating.

Conversely, assume that outside conditions change such that the half filled radiators of normal operation overheat the space in zone I, then the thermostat establishes a low voltage circuit through the 72° F. terminal from the secondary of the transformer U along the line 52, over switch blade 53, and line 55 to the coil of the relay R², and thence along the lines 57 and 58 to the transformer secondary.

The armature of relay R² will consequently move the contact 66 over to the contact 67, thus completing the circuit through the solenoid valve 114, line 69, and back to input line 70 causing the valve stem of the solenoid to rise. This results in breaking communication between the return line I₁ and the vacuum space in the receiver J and also giving the return line access to the atmosphere through the auxiliary atmospheric relief valve 118. The return line quickly "leaks down" to a vacuum consistent with the adjustment of the valve, viz., approximately two inches, and the reduced differential across the radiation system of the zone, decreases the filling of the radiators to an extent sufficient to quickly correct the condition of overheating, whereupon the thermostat resumes the circuit-breaking mid position for normal heating.

Controls for the pump motor M, i. e., the vacuum regulator V, the water level float switch S', the magnetic starter S, and the hand switch 113 are the same as outlined above.

It will be noted that in all the modifications shown, with the exception of the condition when relief valve 118 is in operation, that the air admitted to the vacuum pump receiver is due to leakage in the system. This leakage will be less when the vacuum in the respective zones is at a minimum, and when relief valve 118 is open the zone on which it is operating is disconnected from the vacuum pump. The vacuum pump is thus required to remove less air from the system and is therefore operating for shorter periods, which results in saving in electric current.

The details and arrangements herein shown and described, are intended as illustrative rather than limiting, and may be greatly varied by a skilled mechanic without departing from the scope of the invention as defined in the claims.

Having thus described my invention, what I claim as new and desire to secure by Letters Patent of the United States is:

1. The combination in a vacuum steam heating system for heating a plurality of zones, and having a pumping mechanism for removing the air or gas from the system and creating a vacuum in the return side thereof, said mechanism being common to said zones, of control mechanism for said zones, comprising a variable vacuum relief mechanism, including at least one relief valve for each zone effective to maintain the vacuum in the system at different degrees, and thermostatic means controlled by zone temperatures for controlling said mechanism so that different degrees of vacuum may be created in the returns from each zone independently of each other to accommodate the respective zone temperatures.

2. The combination in a vacuum steam heating system for heating a plurality of zones and having a pumping mechanism for removing the air or gas from the system, and creating, and maintaining a constant degree of vacuum in the return side thereof, said mechanism being common to said zones, of control mechanism for said zones comprising a variable vacuum relief mechanism including at least one relief valve for each zone effective to maintain the vacuum in the system at different degrees, and thermostatic means controlled by zone temperatures controlling said mechanism so that different degrees of vacuum may be created in the returns from each zone independently of the degree of vacuum maintained by the pumping mechanism, to accommodate the respective zone temperatures.

3. The combination in a vacuum steam heating system for heating a plurality of zones and having a pumping mechanism for removing the air or gas from the system, and creating, and maintaining a constant degree of vacuum in the return side thereof, said mechanism being common to said zones, of control mechanism for said zones, comprising a variable vacuum relief mechanism including at least one relief valve for each zone effective to maintain the vacuum in the system at different degrees, and thermostatic means controlled by zone temperatures for controlling said mechanism so that different degrees of vacuum may be created in the returns from each zone independently of each other, and independently of the degree of vacuum maintained by the pumping mechanism, to accommodate the respective zone temperatures.

4. The combination in a vacuum steam heating system for heating a plurality of zones, and having a pumping mechanism for removing the air or gas from the system and creating a vacuum in the return side thereof, said mechanism being common to said zones, of control mechanism for said zones, comprising a variable vacuum relief mechanism effective to maintain the vacuum in the system at different degrees, said mechanism including relief valve means for each zone and thermostatic means controlled by zone temperatures for throwing said valves into and out of operative connection with the return side of the respective zone, independently of each other.

5. A vacuum steam heating system for a plurality of zones to be heated, having a constant steam pressure on the supply side of the system, pumping mechanism for removing the air or gas from the system and creating a vacuum in the return side thereof, said mechanism being common to said zones, variable vacuum relief mechanism effective to maintain the vacuum in the several zones at different degrees, said mechanism including relief valve means for each zone and thermostatic means controlled by zone temperatures for controlling said mechanism so that different degrees of vacuum may be created in the returns from each zone independently of each other, to accommodate the respective zone temperatures.

6. A vacuum steam heating system for a plurality of zones to be heated, having a constant steam pressure on the supply side of the system, pumping mechanism for removing the air or gas from the system and creating a vacuum in the return side thereof, said mechanism being common to said zones, variable relief mechanism effective to maintain the vacuum in the several zones at different degrees, said relief mechanism including relief valve means for each zone, and thermostatic means controlled by zone temperatures for controlling said mechanism so that different degrees of vacuum may be created in the returns from each zone independently of the degree of vacuum maintained by the pumping mechanism.

7. A vacuum steam heating system for a plurality of zones to be heated having a constant steam pressure on the supply side of the system, pumping mechanism for removing the air or gas from the system and creating a vacuum in the return side thereof, said mechanism being common to said zones, variable vacuum relief mechanism effective to maintain the vacuum in the several zones at different degrees, said relief mechanism including relief valve means for each zone, and thermostatic means controlled by zone temperatures for controlling said mechanism so that different degrees of vacuum may be created in the returns from each zone independently of each other, and independently of the degree of vacuum maintained by the pumping mechanism, to accommodate the respective zone temperatures.

8. Control mechanism for a vacuum steam heating system having a plurality of zones to be heated and having a pumping mechanism for removing the air or gas from the system and creating a vacuum in the return side thereof, comprising a variable vacuum relief mechanism effective to maintain the vacuum in the system at different degrees, said relief mechanism including a plurality of relief valves for each zone having relatively different settings to accord with varying temperatures in a zone, each valve being set to maintain a predetermined vacuum under the respective temperatures in a zone, whereby to vary pressure conditions in the returns from that zone and maintain the vacuum at the proper determined degree, and thermostatic means controlled by zone temperatures for throwing each of said valves in to and out of operative connection with the return side of the respective zones, independently of each other, to accommodate its respective zone temperature.

9. A vacuum steam heating system including radiation means for heating a plurality of separated zones, comprising a pumping mechanism and receiver for removing air or gas from the system and creating a vacuum in the returns from the several zones, said pumping mechanism being effective to create and maintain a predetermined vacuum within the receiver, means for applying said vacuum to the returns from the radiation means in said zones to control the amount of steam entering the zones, means for varying the degree of vacuum in the returns from any zone independently of the other zones, thereby to vary the amount of steam entering the respective radiation means, and thermostatically controlled means for controlling said vacuum varying means to accord with desired temperatures in the several zones.

10. A vacuum steam heating system including radiation means for heating a plurality of separated zones, comprising a pumping mechanism and receiver for removing air or gas from the system and creating a vacuum in the returns from the several zones, said pumping mechanism being effective to create and maintain a predetermined vacuum within the receiver, means for applying said vacuum to the returns from the radiation means in said zones to control the amount of steam entering the zones, means for varying the degree of vacuum in the returns from any zone independently of other zones, and independently of the vacuum condition within the receiver, thereby to vary the amount of steam entering the respective radiation means, and thermostatically controlled means for controlling said vacuum varying means to accord with desired temperatures in the several zones.

11. A vacuum steam heating system comprising radiation means having supply and return lines, pumping mechanism for removing air or gas from the radiation means and creating a vacuum in the return side of the system, means for applying said vacuum to the return lines from the radiation means to control the amount of steam, and means for controlling the degree of vacuum maintained in the returns including a reducing valve and additional, cooperating reducing valve means interposed between the pumping mechanism and the radiation means in the returns, and thermostatically operated control means for said reducing valves.

12. A vacuum steam heating system comprising radiation means having supply and return lines, pumping mechanism for removing air or gas from the radiation means and creating a vacuum in the return side of the system, and means for disconnecting the system from the pumping mechanism while maintaining the vacuum in the pumping mechanism, including means to vent the return side.

13. A vacuum steam heating system comprising radiation means having supply and return lines, pumping mechanism for removing air or gas from the radiation means and creating a vacuum in the return side of the system, and means for disconnecting the system from the pumping mechanism while maintaining the vacuum in the pumping mechanism, including a relief valve and thermostatically controlled means to operate said relief valve to vent the return side.

14. A vacuum steam heating system comprising a plurality of radiation means separated in spaced zones, each zone having supply and return lines, pumping mechanism for removing air or gas from the several radiation means, and to which said return lines are connected whereby said pumping mechanism is effective to create a vacuum in the return side of each zone, means for applying said vacuum to the return lines of the several radiation means to control the amount of steam supplied to each of the several radiation means, and means for controlling the degree of vacuum maintained in the returns including a reducing valve, and additional, cooperating reducing valve means interposed between the pumping mechanism and each of the radiation means in the returns, and thermostatically operated control means for said reducing valves.

15. A vacuum steam heating system comprising a plurality of radiation means separated in spaced zones, each having supply and return lines, pumping mechanism for removing air or gas from the several radiation means, and to which said return lines are connected whereby said pumping mechanism is effective to create a vacuum in the return side of each zone, and means for disconnecting the system from the pumping mechanism while maintaining vacuum in the pumping mechanism, including independent means to vent the return side of each zone.

16. A vacuum steam heating system comprising a plurality of radiation means separated in spaced zones, each having supply and return lines, pumping mechanism for removing air or gas from the several radiation means, and to which said return lines are connected whereby said pumping mechanism is effective to create a vacuum in the return side of each zone, and means for disconnecting the system from the pumping mechanism while maintaining vacuum in the pumping mechanism, including a relief valve in the return side of each zone, and thermostatically controlled means to operate said valves whereby to vent the return side of each zone independently.

17. A vacuum steam heating system comprising radiation means having supply and return lines, pumping mechanism for removing air or gas from the radiation means and creating a vacuum in the return side of the system including a receiver for the reception of condensate and vapors, said receiver having an integral water trap built therein, and a vacuum control valve cooperative with said trap to vary pressure conditions in the return size of the system independently of the vacuum maintained in the receiver.

18. A vacuum steam heating system comprising radiation means having supply and return lines, pumping mechanism for removing air or gas from the radiation means and creating a vacuum in the return side of the system including a receiver for the reception of condensate and vapors, means providing a water loop in the return line effective to maintain a vacuum in the receiver, and vacuum control means in the return line effective to vary the degree of vacuum in the return, independently of the maintained vacuum condition within the receiver.

19. A vacuum steam heating system comprising radiation means having supply and return lines, pumping mechanism for removing air or gas from the radiation means and creating a vacuum in the return side of the system including a receiver for the reception of condensate and vapors, a float trap connected to said receiver and vacuum control means cooperative with said trap to vary the degree of vacuum in the return independently of the maintained vacuum condition within the receiver.

20. A vacuum steam heating system comprising a plurality of radiation means separated in spaced zones, each having supply and return lines, pumping mechanism for removing air or gas from the several radiation means, and creating a vacuum in the return side of the system including a receiver for the reception of condensate and vapors, said receiver having integral water traps built therein, one for each zone, and means including vacuum control valves cooperative with said traps to vary pressure conditions in the return side of the several zones independently of the vacuum maintained in the receiver.

IRVING C. JENNINGS.

CERTIFICATE OF CORRECTION.

Patent No. 2,162,952.                                                     June 20, 1939.

IRVING C. JENNINGS.

It is hereby certified that error appears in the printed specification of the above numbered patent requiring correction as follows: Page 3, first column, line 73, after the word "system" insert return; and second column, line 37, after "coil" insert of; page 5, second column, line 49, for the reference numeral "14" read 114; page 8, first column, line 8, claim 6, after "mechanism" and before the period, insert to accommodate the respective zone temperatures; and that the said Letters Patent should be read with this correction therein that the same may conform to the record of the case in the Patent Office.

Signed and sealed this 15th day of August, A. D. 1939.

Leslie Frazer (Seal)                              Acting Commissioner of Patents.